Patented Nov. 6, 1928.

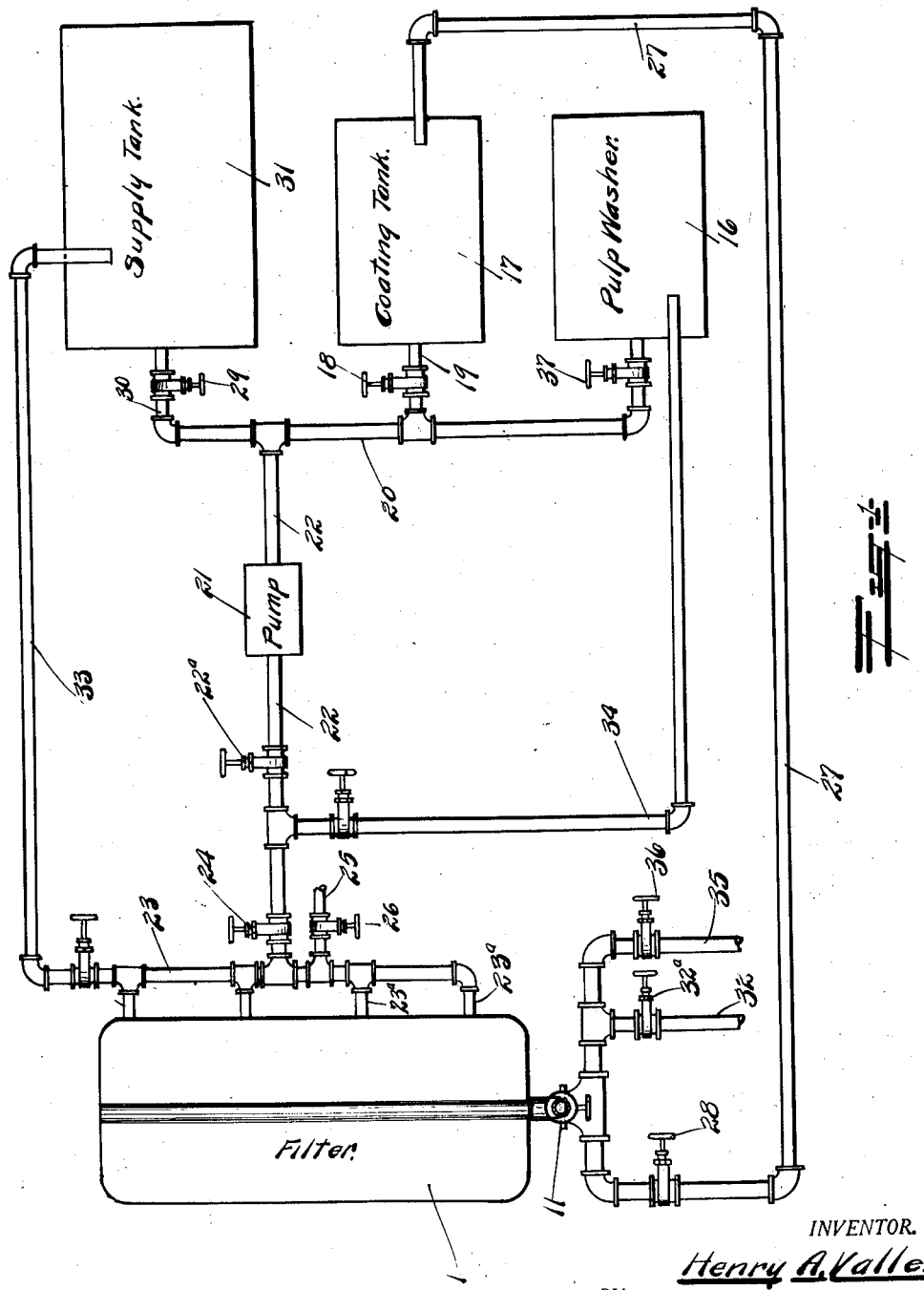

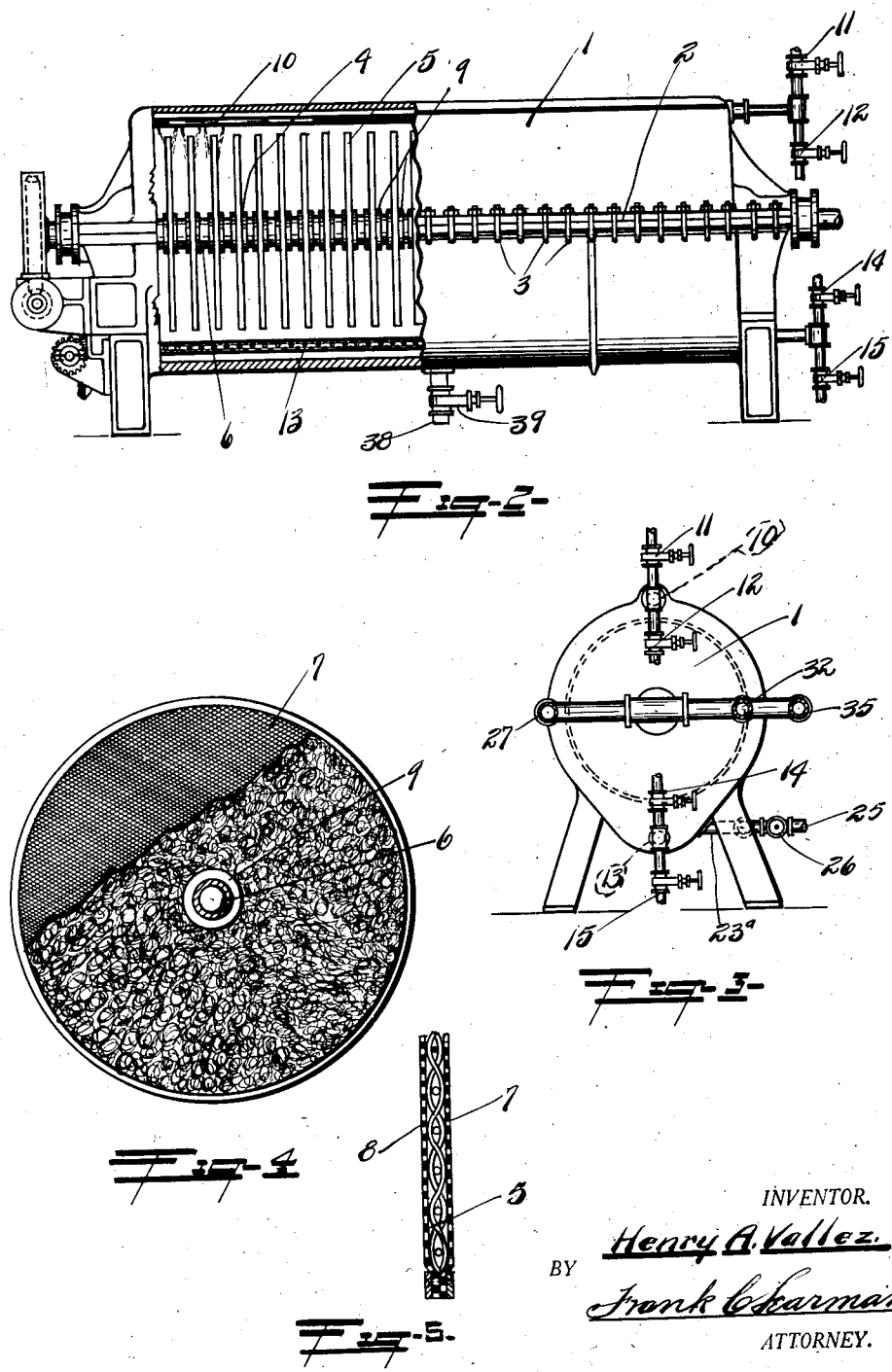

1,691,001

UNITED STATES PATENT OFFICE.

HENRY A. VALLEZ, OF BAY CITY, MICHIGAN.

PROCESS FOR FILTERING ELEMENTS.

Application filed May 19, 1922. Serial No. 562,257.

This invention relates to a process for forming a deposit or coating on the face of a filtering screen, and particularly to a process for forming a coating of uniform thickness of the face thereof.

One object of the invention is to evenly and quickly coat the filtering surface of the filtering element so that every part of the said element will be of uniform thickness, and thereby provide perfect filtration.

Another object is to provide a process for the filtration of liquids, in which the coating or filtering medium can be mixed with clean filtered liquid, forming a mixture which can be pumped into the filter, and which will evenly form on the filtering element in a homogeneous mass, and to any desired thickness, and which can, when laden with the refuse, etc., be dissolved into its original state, to allow it to be returned to a suitable receptacle for washing, preparatory to again being used.

A further object is to provide a process in which the filtering medium can be removed and washed without opening the filter.

The above and other objects will appear as the specification progresses, reference being had to the accompanying drawings in which like reference numerals indicate like parts throughout the several views thereof.

In the drawings:—

Fig. 1 is a top plan view illustrating the arrangement of the tanks and filter for carrying out my improved process.

Fig. 2 is an enlarged view of the filter proper.

Fig. 3 is an end view thereof.

Fig. 4 is a view illustrating the filtering medium formed on the face of the filter, and Fig. 5 is an enlarged fragmentary sectional edge view of one of the filtering frames.

Referring now particularly to the drawings, the filter illustrated therein is termed a rotary filter, and is a filter in which the filtering screens or elements rotate inside of a shell or casing into which the juice to be filtered is injected.

In a process of this nature, it is essential that the filtering element rotate to provide for the even coating of the filtering surface, otherwise sections of the filtering element will be unevenly coated, and numerous leaks will develop, as with this type of filter a pressure is maintained within the shell.

As stated this invention is directed to the manner of coating the filtering element, and I do not deem it necessary to specifically describe the construction of the filter, nor the method of driving the said element, as this is not essential and forms no part of the present invention.

The filter comprises a cylindrical shell or casing 1 split on the horizontal center line 2 into two halves, which are adapted to be secured together by means of bolts 3. A filtering element 4 is rotatably mounted in this shell, and comprises a series of frames 5 mounted on a hollow shaft 6, one end of the hollow shaft having a worm wheel mounted thereon, and which is adapted to be driven in any suitable manner, and from any suitable source of power.

The frame proper comprises a pair of spaced apart screens 7 and 8 secured to the hub 9, which is provided with slotted openings communicating with similar openings formed in the hollow shaft to provide for the passage of the filtered juices. A spray pipe 10 is provided in the top of the shell, and this pipe is provided with the water and compressed air connections 11 and 12 respectively, suitable valves being provided for controlling the flow of air or water therein. Small discharge openings are provided in this pipe 10 for directing the spray against the sides of the screens as they rotate, and when it is desired to clean the cake therefrom.

A perforated pipe 13 is mounted in the lower half of the shell, and this pipe is also provided with the air and water connections 14 and 15 respectively, and for a purpose to be presently described.

Heretofore it has been customary to use cloths on the filtering elements, but this required considerable labor to attach each cloth to its respective frame, and the cloths wear out in the due course of time, also, leaks develop when the cloths are not uniform, or wear in certain spots. In my improved process this labor is eliminated, and the bulk of the cloth cost is saved.

In practise I use a fine paper pulp, or a bleached sulphite pulp. This I place in a tank or receptacle 16, and boil and soak until the mass is entirely disintegrated and washed, I then drain the water into a sewer, place the pulp in a tank 17, and mix it with clear filtered juice until it is of a consistency to readily flow. The valve 18 in the pipe 19 is then opened, allowing the mixture to enter the pipe line 20, and flow to a conventional circulating pump 21 through a pipe 22, and thence to the pipe line 23 which is provided with branches 23ª communicating with the filter, a valve 24 being provided in the line 22 as shown. The pump thoroughly agitates and mixes the pulp mixture forcing it to the pipe line 23, and into the filter through the branches as described. A water connection 25 also communicates with the pipe line 23, and a valve 26 is provided for controlling the flow of liquid therein.

When the mixture is injected into the filter, it will filter through the filtering element, and deposit the pulp fibre on the face thereof. Naturally some of the pulp passes through the filter at first, circulating through the hollow shaft, and thence through the pipe line 27 to the tank 17, but continuous circulation will rapidly build up the coating to the desired thickness. A valve 28 is also provided in this pipe line 27 for controlling the flow of liquid.

While the mixture is circulating, and the deposit or coating is being formed on the filtering element, the frames are slowly rotating, and this rotation of the frames combined with the continuous circulation of the pulp mixture, insures a perfect and uniform thickness or deposit of the filtering medium or pulp on the frames. The pulp can be first washed and then mixed with clear water if desired. In this event the water can be forced out by compressed air before beginning filtration, by mixing with clear filtered liquid. This is eliminated and a clean filtering medium is secured.

After the filtering medium is deposited on the frames, the valve 28 is closed, and the valve 29 which is located in the pipe 30 communicating with the supply tank 31 is then opened. The juice to be filtered flows to the pump 21 and is forced into the filter, passing through the filtering medium on the frames, thence flowing through the hollow shaft and into a branch connection 32 leading to a suitable tank or receptacle (not shown), the usual valve 32ª being provided as shown.

When the filter becomes dirty the valves 32ª, 24, 22ª and 29 are again closed, the juice in the filter is forced back to the supply tank through the pipe line 33 by compressed air introduced into the hollow shaft through the pipe 32, and water is introduced through the connection 25, the valve 36 in the line 35 is opened, and as this water passes through the filter, it takes up the juice in the filtering element. This water then flows to a separate tank (not shown). The valve 36 is then closed and the filter filled about one half full of water. The steam and compressed air connections are then opened, the steam heating the water in the filter, while the air sets up a violent agitation therein. The valves 11 and 12 are then opened, and direct a spray against the sides of the frames, and as the filtering element slowly rotates, the filtering medium rapidly disintegrates, and is washed cleanly from the frames. The mixture within the filter is then in its original state. The valve 24 is then opened, and valve 22ª is then closed, and the mixture is forced to the pulp washer 16 through the pipe line 34. The pulp is then thoroughly washed, after which the valve 37 is opened, and the mixture is again introduced to the tank 17 preparatory to being again deposited on the frames.

A pipe 38 leads from the bottom of the filter to the sewer, a valve 39 being provided as shown, and when the filter is washed, this water can be directed to the sewer. The valves on the other communicating connections are closed accordingly, and the filter is then blown out with compressed air.

From the foregoing description it will be obvious that I have perfected an improved process for evenly coating the surface of a rotating filtering element.

What I claim is:—

1. A process for filtering which consists in circulating a mixture of pulp and liquid through a rotating filtering element to form on the filtering element a uniform coating of pulp to provide a filter mat for said element, filtering juices under pressure through the filtering element after the formation of the filter mat until the latter becomes clogged, reversing the flow of the juices to remove the juices in the filter and return the said juices to the source of supply, removing the pulp from the clogged filtering element, washing the pulp after such removal, and finally recoating the filtering element with the washed pulp by circulating a mixture of the same pulp and liquid through the filtering element.

2. A process for filtering which consists in mixing pulp with clean juice, circulating the mixture continuously through a rotating filtering element to form thereon a uniform coating of pulp to provide a filter mat, filtering juices under pressure until the filter mat becomes clogged, reversing the flow of the juices to remove the juices in the filter and return the said juices to the source of supply, removing the pulp from the clogged filtering element, washing the pulp after such removal, and finally recoating the filtering element with the washed pulp by circulating through the filtering element a mixture of washed pulp and juice.

3. A process for filtering which consists in mixing pulp with clean juice, circulating the mixture continuously through a rotating filtering element under pressure to deposit the pulp on the filtering element to produce a filter mat of uniform thickness, filtering juices under pressure until the filtering mat becomes clogged, reversing the flow of the juices to remove the juices in the filter and return the said juices to the source of supply, removing the coating from the clogged filtering element, washing the pulp after such removal, mixing the washed pulp with clean juice, and finally recoating the filtering element by continuously circulating the latter through the filtering element while the same is being rotated.

In testimony whereof I affix my signature.

HENRY A. VALLEZ.